United States Patent [19]

Tame

[11] Patent Number: 5,733,008
[45] Date of Patent: Mar. 31, 1998

[54] SAFETY LOCK FOR NON-LINEAR RECLINER MECHANISM

[75] Inventor: Omar D. Tame, W. Bloomfield, Mich.

[73] Assignee: Atoma International, Inc., Markham, Canada

[21] Appl. No.: 760,879

[22] Filed: Dec. 9, 1996

[51] Int. Cl.$^6$ .................................. B60N 2/02; B60N 2/22
[52] U.S. Cl. ................. 297/378.11; 297/367; 297/216.1; 297/369
[58] Field of Search ........................... 297/367, 369, 297/378.11, 216.1

[56] References Cited

U.S. PATENT DOCUMENTS

| | | | |
|---|---|---|---|
| 3,848,923 | 11/1974 | Dehler | 297/378.11 |
| 4,225,177 | 9/1980 | Kluting | 297/378.11 |
| 4,429,929 | 2/1984 | Klueting et al. | 297/378.11 |
| 4,438,974 | 3/1984 | Kresky et al. | 297/378.11 |
| 4,634,182 | 1/1987 | Tanaka | 297/378.11 |

*Primary Examiner*—Peter M. Cuomo
*Assistant Examiner*—Anthony D. Barfield
*Attorney, Agent, or Firm*—Cushman, Darby & Cushman IP Group of Pillsbury Madison & Sutro LLP

[57] ABSTRACT

A vehicle seat includes a seat cushion assembly for supporting an occupant seated thereon. A seat back cushion assembly is provided for supporting the back of an occupant seated on the seat cushion assembly. An adjusting mechanism is operatively associated with the seat back cushion assembly and is constructed and arranged to enable the seat back cushion assembly to be moved in opposite directions through a range of adjusting movements with respect to the seat cushion assembly. The adjusting mechanism includes a locking and releasing device constructed and arranged to be moved between (1) a locking position preventing the adjusting movements from being affected and (2) a releasing position wherein the locking and releasing device is operable to release the adjusting mechanism to permit the adjusting movements. A lock and release system is operatively associated with the seat back cushion assembly and has a locking member movable between a released position permitting the adjusting movements of the seat back cushion assembly and a locked position preventing movement of the seat back cushion assembly. The secondary lock and release system includes shock absorbing structure constructed and arranged to control the movement of the locking member in response to the sensing of a crash condition which occurs while the locking and releasing device is in the releasing position.

7 Claims, 3 Drawing Sheets

SAFETY LOCK FOR NON-LINEAR RECLINER MECHANISM

BACKGROUND OF THE INVENTION

This invention relates to a vehicle seat, and more particularly, to a vehicle seat having a seat back cushion assembly pivotally mounted with respect to a seat cushion assembly and having a secondary lock and release device for preventing unwanted pivotal movement of the seat back cushion assembly during a crash condition.

Vehicle seat assemblies typically include a seat cushion assembly and a seat back cushion assembly pivotally mounted with respect to the seat cushion assembly so as to pivot forwardly to permit easy entry into a passenger compartment of a vehicle and to pivot rearwardly into a selected reclined position. These vehicle seats commonly include a latch mechanism which is manually operated by a handle. The latch mechanism, in its latching position, locks the seat back cushion assembly with respect to the frame of the seat cushion assembly. When the handle is moved thereby moving the latching mechanism to a releasing position, the seat back cushion assembly may be moved through a range of adjusting positions. Once the desired position is located, the operator releases the handle which in turn causes latch mechanism to return to the latching position locking the seat back cushion assembly with respect to the frame of the seat cushion assembly.

It has been determined that if the seat back cushion assembly is adjusted while the vehicle is in operation and a crash condition occurs, movement of the seat back cushion assembly may be accelerated which may result in passenger injury.

Accordingly, a need exists to provide a secondary lock and release system which is constructed and arranged to control movement the seat back cushion assembly in response to the sensing of a crash condition which occurs while a primary latch device is in a releasing position.

SUMMARY OF THE INVENTION

An object of the present invention is to fulfill the need referred to above. In accordance with the principles of the present invention, this objective is obtained by providing a vehicle seat including a seat cushion assembly constructed and arranged to support an occupant seated thereon. A seat back cushion assembly is constructed and arranged to support the back of an occupant seated on the seat cushion assembly. A first mounting assembly is constructed and arranged to mount the seat cushion assembly on a vehicle floor assembly and a second mounting assembly is constructed and arranged to mount the seat back cushion assembly with respect to the seat cushion assembly.

An adjusting mechanism is operatively associated with the seat back cushion assembly and is constructed and arranged to enable the seat back cushion assembly to be moved in opposite directions through a range of adjusting movements with respect to the seat cushion assembly. The adjusting mechanism includes a locking and releasing device constructed and arranged to be moved between (1) a locking position preventing the adjusting movements from being affected and (2) a releasing position wherein the locking and releasing device is operable to release the adjusting mechanism to permit the adjusting movements.

A lock and release system is operatively associated with the seat back cushion assembly and has a locking member movable between a released position permitting the adjusting movements of the seat back cushion assembly and a locked position preventing movement of the seat back cushion assembly. The secondary lock and release system includes shock absorbing structure constructed and arranged to control the movement of the locking member in response to the sensing of a crash condition which occurs while the locking and releasing device is in the releasing position.

Other objects, features and characteristics of the present invention, as well as the function of the related elements of the structure, and the combination of the parts and economies of manufacture, will become apparent upon consideration of the following detailed description and the appended claims with reference to the accompanying drawings, all of which form a part of this specification.

DETAILED DESCRIPTION OF THE PRESENTLY PREFERRED EXEMPLARY EMBODIMENTS

Figure 1:
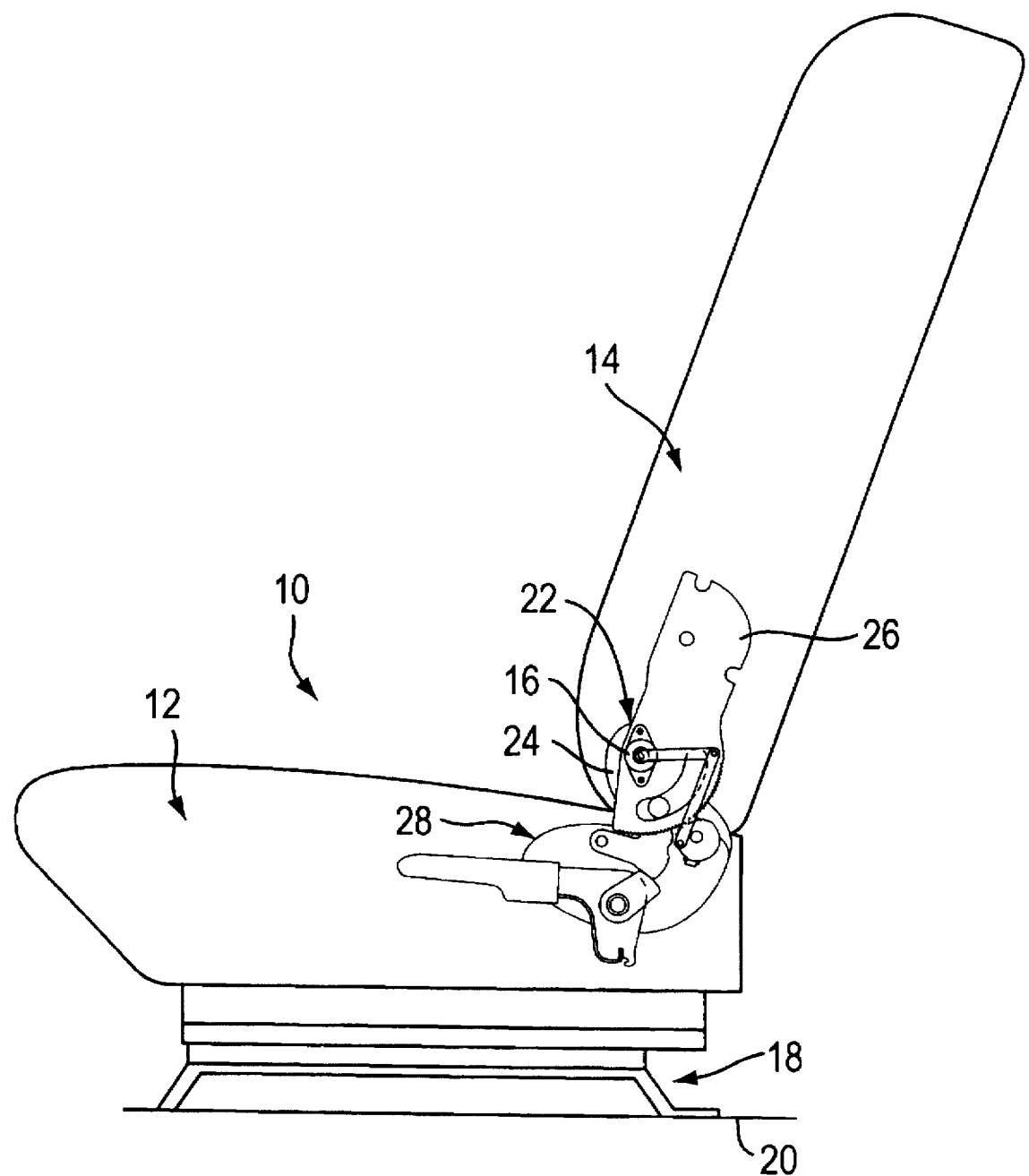
FIG. 1 is a schematic side view of a vehicle seat mounted on the floor of a vehicle including an adjusting mechanism, and a secondary lock and release system, provided in accordance with the principles of the present invention.

Referring now to the drawings, a vehicle seat is shown, generally indicated at 10, which embodies the principles of the present invention.

As shown in FIG. 1, the vehicle seat 10 includes a seat cushion assembly, generally indicated at 12, constructed and arranged to support an occupant seated thereon. A seat back cushion assembly, generally indicated at 14, for supporting the back of an occupant seated on the seat cushion assembly is pivotally coupled to the seat cushion assembly at pivot 16. A first mounting assembly, generally indicated at 18, is constructed and arranged to mount the seat cushion assembly 12 on a vehicle floor 20. The seat cushion assembly may be mounted in any conventional manner, to move fore and aft with respect to the longitudinal axis of the vehicle and in any other known adjustable positions.

A second mounting assembly 22 is constructed and arranged to mount the seat back cushion assembly 14 to the seat cushion assembly 12. The second mounting assembly includes at least one bracket 24 which is coupled to a frame portion 31 of the seat cushion assembly 12. The seat back cushion assembly 14 also includes a bracket 26 which is fixed to a frame portion of the seat back cushion assembly 14. The bracket 26 is pivotally coupled to the bracket 24 at pivot 16.

Figure 2:
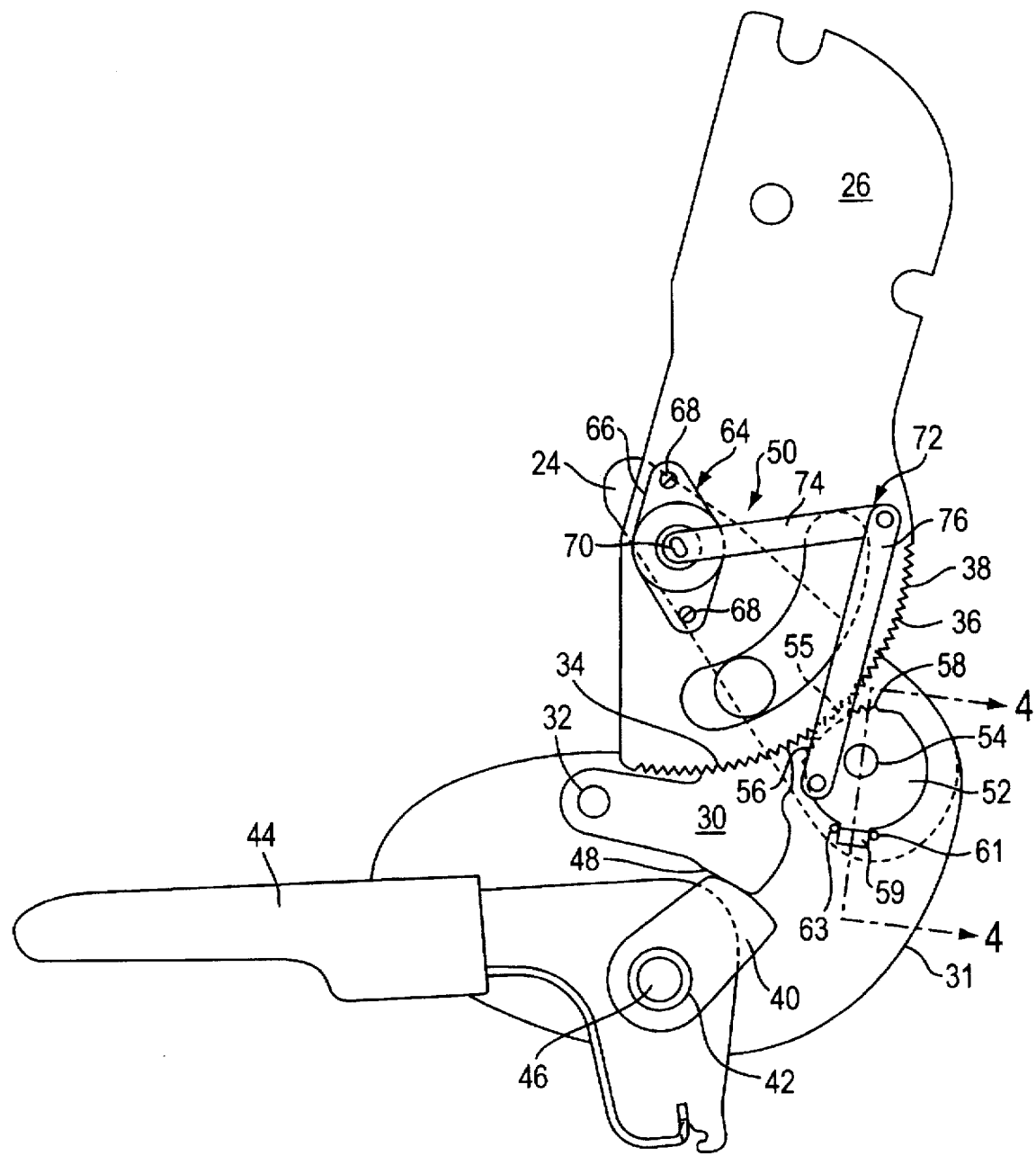
FIG. 2 is an enlarged side view of the adjusting mechanism and secondary lock and release system of FIG. 1, shown with the adjusting mechanism in a locking position and the secondary lock and release system in a released position.

The vehicle seat 10 includes an adjusting mechanism, generally indicated at 28, constructed and arranged to enable the seat back cushion assembly 14 to be moved in opposite directions through a range of adjusting movements with respect to the seat cushion assembly 12. As best shown in FIG. 2, the adjusting mechanism 28 includes a locking and releasing device which, in the illustrated embodiment, is in the form of a pawl 30. The pawl 30 is pivotally coupled to a frame portion 31 of the seat cushion assembly 12 at pivot 32. The pawl 30 includes a series of teeth 34 which are arranged on an arc so as to cooperate with a series of teeth 36 of a sector gear portion 38 of the bracket 26. The adjusting mechanism 28 further includes a cam member 40 which is fixed at connection 42 to a manually movable handle member 44.

Figure 3:
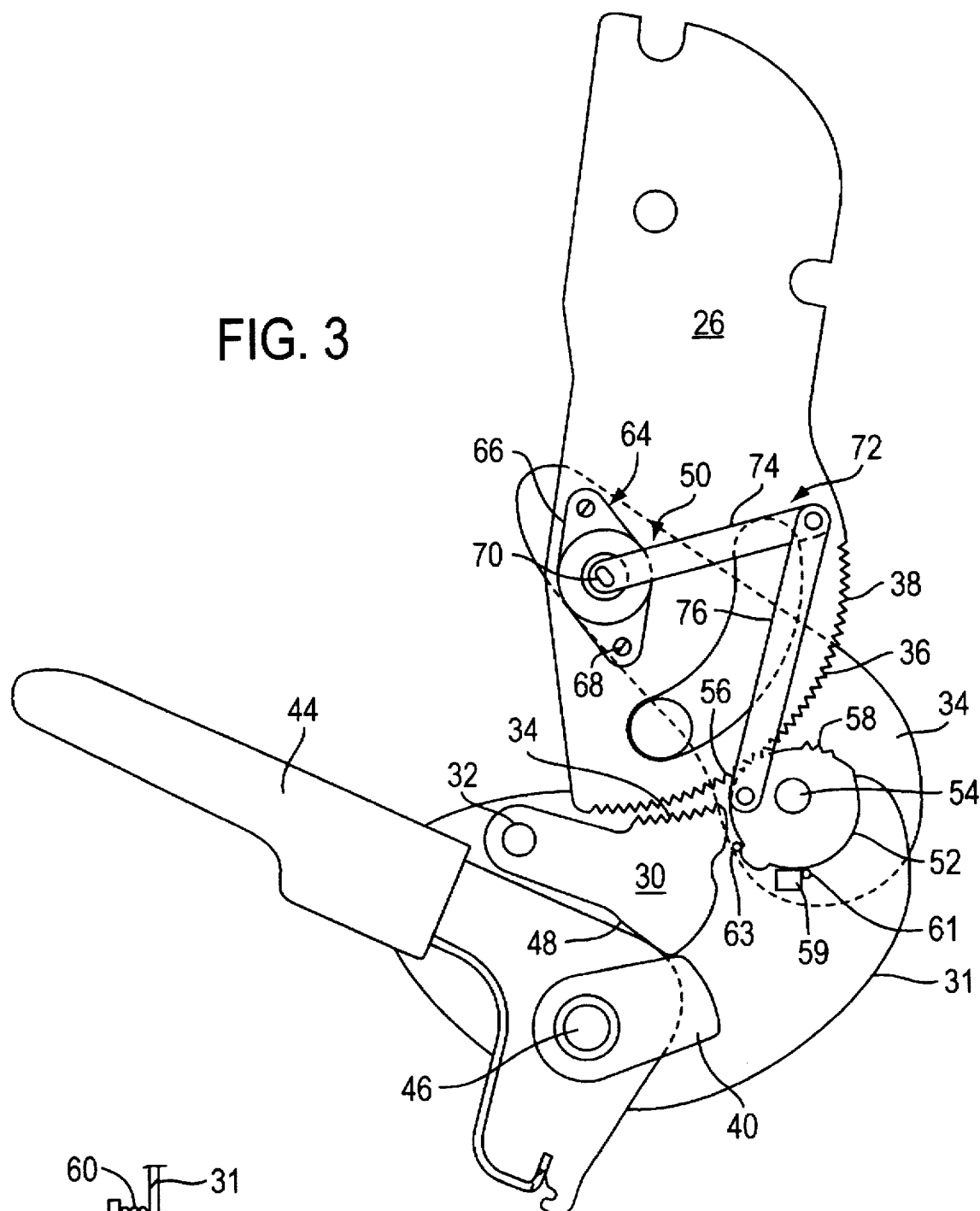
FIG. 3 is a view similar to FIG. 2, showing the adjusting mechanism in a releasing position and the secondary lock and release system in a locked position.

With reference to FIGS. 2 and 3, it can be appreciated that the handle member 44 is pivotally mounted with respect to the seat cushion assembly at pivot 46 so as to be moved from a pawl locking position to a pawl releasing position. Thus, as shown in FIG. 2, in the locking position, the cam member 40 is engaged with cam surface 48 of the pawl 30 and the teeth 34 of the pawl 30 are engaged with certain of the teeth 36 of the sector gear 38. If adjustment of the seat back cushion assembly 14 is desired, the handle member 44 is manually lifted into a position shown in FIG. 3 which displaces the cam member 40, which in turn releases the cam member from the cam surface 48 causing the pawl 30 to pivot downwardly and out of engagement with the teeth 36 of the sector gear portion 38. Thus, the seat back cushion assembly 14 is in a condition so as to be manually moved about its pivot 16 to any desired reclined position of adjustment within the range of adjustable positions defined by the sector gear portion 38. Once the desired position of the seat back cushion assembly 14 is located, the handle member 44 is released. The handle member may be spring biased so as to automatically return to the position shown in FIG. 2. This action places the cam member 40 into engagement with the cam surface 48 of the pawl 30 thereby rotating the pawl 30 about its pivot 32 so that the teeth 34 of the pawl 30 engage with the teeth 36 of the sector gear portion 30. The seat back cushion assembly 14 is thus locked to the seat cushion assembly 12.

Adjustment of the seat back cushion assembly 14 should always be made while the vehicle is not operating. However, it has been determined that many drivers and passengers adjust their seat back cushion assembly while the vehicle is operating. However, if the seat back cushion assembly 14 is adjusted during a crash condition, the seat back cushion assembly 14 may be rapidly accelerated due to the impact force. This condition may cause injury to the seat occupant.

In accordance with the principles of the present invention, a secondary lock and release system, generally indicated at 50, is operatively associated with the seat back cushion assembly 14. The secondary lock and release system 50 includes a locking member 52 pivotally mounted with respect to the frame portion 31 of the seat cushion assembly 12 at pivot 54 so as to be movable between a released position permitting the adjusting movements of the seat back cushion assembly 14 to be affected, and a locked position preventing movement of the seat back cushion assembly 14 relative to the seat cushion assembly 12. In the illustrated embodiment, the locking member 52 includes first and second teeth sets 56 and 58, respectively, disposed in spaced relation on a cam surface 55 thereof. The teeth sets 56 and 58 are defined on the cam surface 55 such that pitch circles of the teeth are on centers which are offset from the pivotal axis of the locking member 52. This arrangement prevents a wedging action from occurring when the locking member 52 is engaged with the teeth 36 of the sector gear portion 38.

Figure 4:
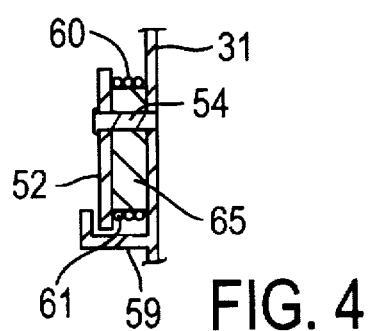
FIG. 4 is sectional view taken along the line 4—4 in FIG. 2.

The secondary lock and release system 50 also includes a spring 60 which biases the locking member 52 to its centered or released position. As best shown in FIGS. 2 and 4, the spring 60 is a coiled spring having one end 61 engaged with flange 59 of the frame portion 31 and the other end 63 is engaged with the locking member 52 such that the spring 60 can accommodate movement of the locking member 52 in opposite directions. A spacer 65 may be provided to support the spring 60 at at least one portion thereof. The spring 60 is constructed and arranged such that in a centered position thereof, the coils of the spring 60 are larger than when the spring is being stressed. Rotation of the locking member 62 directly affects the spring 60.

The secondary lock and release system 50 also includes shock absorbing structure, generally indicated at 64, constructed and arranged to control the movement of the locking member 52 and thus the seat back cushion assembly 14 in response to the sensing of a crash condition which may occur while the pawl 30 of the locking and release device is in its releasing position.

The shock absorbing structure 64 includes a housing 66 fixed to the frame structure or bracket 26 by screws 68 or the like so as to pivot together with the bracket 26 during the adjusting movements of the seat back cushion assembly 14. A rotatable shaft 70 extends from the housing 66 and a fluid is sealed within the housing 26 for controlling movement of the shaft 70 with respect to the housing 66. The fluid may be an oil or other similar fluid.

A two bar linkage, generally indicated at 72, connects the shock absorbing structure 64 to the locking member 52. As shown, one end of link 74 is coupled to the shaft 70 and the other end of link 74 is pivotally coupled to one end of a second link 76. The other end of the second link 76 is pivotally coupled to the locking member 52

The shock absorbing structure 64, in the form of a hydraulic coupling device is constructed and arranged such that during normal adjusting movement of the seat back cushion assembly 14, pivotal movement of the housing 66 is not transmitted to the shaft 70 due to hydraulic slip of the shaft 70. However, when accelerated movement of the seat back cushion assembly 14 occurs, for example in response to a crash condition, hydraulic slip of the shaft will not occur and the shaft 70 will move with the pivoting housing 66 which in turn moves the linkage 72 thereby moving the locking member 52 against the bias of spring 60 to a locked position, as shown in FIG. 3. Thus, even if the seat back cushion assembly 14 is being adjusted (the pawl 30 is in its releasing position), and a crash condition occurs, the acceleration of the seat back cushion assembly 14 causes the shock absorbing structure 64 to move the locking member 52 via the linkage 72 to its locked position preventing further accelerated movement of the seat back cushion assembly 14. Once the crash condition is over, the centering spring 60 biases the locking member 52 back to its released position.

With regard to the FIGS. 1–3, it can be appreciated that the components shown other than the handle 44 are covered with a cover member (not shown) in the conventional manner.

The viscosity of the fluid in housing 66 has an effect on the speed at which movement of the shaft 70 will occur. Consequently, since the shaft movement must overcome the resistance of the centering spring 60, the effect of changes in viscosity due to temperature changes can be offset by using a temperature sensitive spring. Thus, in the illustrated embodiment, the spring 60 is made of 55 NITINOL, a nickel-titanium alloy, to provide the offset. With such material, the colder the spring 60 becomes, the stiffer the spring gets to compensate for temperature changes of the fluid in housing 66.

It can be seen that the vehicle seat 10 of the present invention provides an effective means of locking the seat back cushion assembly 14 in the event the seat back cushion assembly is being adjusted while a collision occurs.

While the invention has been described in connection with what is presently considered to be the most practical and preferred embodiment, it is understood that the invention is not limited to the disclosed embodiment but, on the contrary, is intended to cover various modification and equivalent arrangements within the spirit and scope of the appended claims.

What is claimed is:

1. A vehicle seat comprising:

a seat cushion assembly having a construction configured to support an occupant seated thereon, a seat back cushion assembly having a construction configured to support the back of an occupant seated on said seat cushion assembly, a first mounting assembly constructed and arranged to mount said seat cushion assembly on a vehicle floor assembly in a position suitable to support an occupant seated on said seat cushion assembly, a second mounting assembly having a construction configured to mount said seat back cushion assembly with respect to said seat cushion assembly in a position suitable to support the back of an occupant seated on said seat cushion assembly, an adjusting mechanism operatively associated with said seat back cushion assembly and constructed and arranged to enable said seat back cushion assembly to be moved in opposite directions through a range of adjusting movements with respect to said seat cushion assembly, said adjusting mechanism including a locking and releasing device constructed and arranged to be moved between (1) a locking position preventing said adjusting movements from being affected and (2) a releasing position wherein the locking and releasing device is operable to release said adjusting mechanism to permit said adjusting movements;

a secondary lock and release system operatively associated with said seat back cushion assembly and having a locking member movable between a released position permitting said adjusting movements of said seat back cushion assembly and a locked position preventing movement of said seat back cushion assembly, said secondary lock and release system including a hydraulic coupling device having hydraulic slip characteristic which does not occur to move said locking member from said released position to said locked position in response to the sensing of a crash condition which occurs while said locking and releasing device is in said releasing position.

2. A vehicle seat comprising:

a seat cushion assembly having a construction configured to support an occupant seated thereon, a seat back cushion assembly having a construction configured to support the back of an occupant seated on said seat cushion assembly, a first mounting assembly constructed and arranged to mount said seat cushion assembly on a vehicle floor assembly in a position suitable to support an occupant seated on said seat cushion assembly, a second mounting assembly having a construction configured to mount said seat back cushion assembly with respect to said seat cushion assembly in a position suitable to support the back of an occupant seated on said seat cushion assembly, an adjusting mechanism operatively associated with said seat back cushion assembly and constructed and arranged to enable said seat back cushion assembly to be moved in opposite directions through a range of adjusting movements with respect to said seat cushion assembly, said adjusting mechanism including a locking and releasing device constructed and arranged to be moved between (1) a locking position preventing said adjusting movements from being affected and (2) a releasing position wherein the locking and releasing device is operable to release said adjusting mechanism to permit said adjusting movements;

a secondary lock and release system operatively associated with said seat back cushion assembly and having a locking member movable between a released position permitting said adjusting movements of said seat back cushion assembly and a locked position preventing movement of said seat back cushion assembly, said secondary lock and release system including shock absorbing structure constructed and arranged to move said locking member from said released position to said locked position in response to the sensing of a crash condition which occurs while said locking and releasing device is in said releasing position, and wherein the shock absorbing structure is coupled to said locking member by a linkage and a spring member biases said locking member to its released position, said shock absorbing structure being mounted to said seal back cushion assembly so as to pivot therewith when said seat back cushion assembly is moved through the adjusting movements thereof, said shock absorbing structure being constructed and arranged such that when said locking and release device is in said releasing position (1) during normal movement of said seat back cushion assembly through said adjusting movements, pivotal movement of said shock absorbing structure is not transmitted to said linkage and said biased locking member remains in its released position and (2) during a crash condition causing accelerated movement of said seat back cushion assembly, pivotal movement of said shock absorbing structure is transmitted to said linkage which in turn moves said locking member against the bias of the spring thereon to its locked position thereby preventing further movement of the seat back cushion assembly.

3. The vehicle seat according to claim 2, wherein said locking and releasing device comprises:

a sector gear disposed on said second mounting assembly, a locking pawl pivotally mounted with respect to said first mounting structure and having an engaging portion constructed and arranged such that when said locking and releasing device is moved into said locking position said pawl is in engaged relation with said sector gear portion preventing said adjusting movements from being affected and when said locking and releasing device is moved into said releasing position said pawl is disengaged from said sector gear portion to permit said adjusting movements, a cam member operatively associated with said locking pawl and constructed and arranged to move said locking pawl between the locking position and releasing position thereof, and a manually operated handle member coupled with said cam member for moving said cam member to affect the movements of said locking pawl.

4. The vehicle seat according to claim 3, wherein said shock absorbing structure includes a housing mounted on said frame structure for pivotal movement therewith during the adjusting movements of the seat back cushion assembly, a rotatable shaft extending from said housing, and a fluid sealed within said housing, said linkage being coupled to said shaft, said shock absorbing structure being constructed and arranged such that during the normal adjusting movements of said seat back cushion assembly, the fluid does not transmit the pivotal movement of said housing to the shaft, but when said accelerated movement of said seat back cushion assembly occurs in response to a crash condition, the fluid transmits sufficient pivotal movement of said housing to said shaft to enable the movement of the shaft to move said linkage thereby to move said locking member to its locked position.

5. The vehicle according to claim 4, wherein said spring is a temperature sensitive spring constructed and arranged to change stiffness in response to changes in temperature such that said spring offsets viscosity changes of the fluid in said housing due to changes in temperature of the fluid.

6. The vehicle seat according to claim 5, wherein said spring is comprised of a nickel-titanium alloy.

7. The vehicle seat according to claim 3, wherein said teeth of said locking member comprise first and second teeth sets disposed in spaced relation on a cam surface of said locking member, said teeth sets being defined on said cam surface such that pitch circles of the teeth are on centers which are offset from a pivotal axis of the locking member.

* * * * *

UNITED STATES PATENT AND TRADEMARK OFFICE
CERTIFICATE OF CORRECTION

PATENT NO. : 5,733,008
DATED : March 31, 1998
INVENTOR(S) : Omar D. Tame

It is certified that error appears in the above-identified patent and that said Letters Patent is hereby corrected as shown below:

On the title page, insert the following:

| U.S. PATENT DOCUMENTS | | |
|---|---|---|
| Document Number | Date MM/YYYY | Name (Family Name of First Inventor) |
| 5,248,233 | 09/1993 | WEBSTER |

| FOREIGN PATENT DOCUMENTS | | | |
|---|---|---|---|
| Document Number | Date MM/YYYY | Country | Inventor Name |
| 0 509 865 A2 | 10/1992 | EUROPE | YAMAMURA |
| 0 425 918 A2 | 05/1991 | EUROPE | ENGELHARDT |
| 2 406 539 | 10/1978 | FRANCE | KLUTING |

| OTHER (Including in this order Author, Title, Periodical Name, Date, Pertinent Pages, etc.) |
|---|
| WALKER, J.A., "A small rotary actuator based on torsionally strained SMA", *Proceedings of the IEEE Micro Robots and Teleoperators Workshop. An Investigation of Micromechanical Structures, Actuators and Sensors*, 9 Nov 1987, pgs. 1-3 |

Signed and Sealed this

Sixteenth Day of February, 1999

Attest:

*Acting Commissioner of Patents and Trademarks*

Attesting Officer